United States Patent
Wong et al.

(10) Patent No.: US 11,256,275 B2
(45) Date of Patent: Feb. 22, 2022

(54) POWER SUPPLY ADJUSTING SYSTEM, METHOD AND APPARATUS, CHIP, AND ELECTRONIC DEVICE

(71) Applicant: CHENGDU HAIGUANG INTEGRATED CIRCUIT DESIGN CO., LTD., Sichuan (CN)

(72) Inventors: Yuqian Cedric Wong, Austin, TX (US); Shuiyin Yao, Beijing (CN); Hongchang Liang, Austin, TX (US); Zhimin Tang, Beijing (CN)

(73) Assignee: CHENGDU HAIGUANG INTEGRATED CIRCUIT DESIGN CO., LTD., Sichuan (CN)

( * ) Notice: Subject to any disclaimer, the term of this patent is extended or adjusted under 35 U.S.C. 154(b) by 0 days.

(21) Appl. No.: 17/254,245

(22) PCT Filed: Dec. 30, 2019

(86) PCT No.: PCT/CN2019/129922
§ 371 (c)(1),
(2) Date: Dec. 18, 2020

(87) PCT Pub. No.: WO2021/134216
PCT Pub. Date: Jul. 8, 2021

(65) Prior Publication Data
US 2021/0232164 A1    Jul. 29, 2021

(51) Int. Cl.
*G05F 1/46*  (2006.01)

(52) U.S. Cl.
CPC ..................... *G05F 1/46* (2013.01)

(58) Field of Classification Search
None
See application file for complete search history.

(56) References Cited

U.S. PATENT DOCUMENTS

| | | | |
|---|---|---|---|
| 6,229,292 B1 * | 5/2001 | Redl | G05F 1/565 |
| | | | 323/224 |
| 6,538,497 B2 | 3/2003 | Thomas et al. | |
| 6,909,265 B2 * | 6/2005 | Tang | G06F 1/305 |
| | | | 323/272 |

(Continued)

FOREIGN PATENT DOCUMENTS

| CN | 101442215 A | 5/2009 |
|---|---|---|
| CN | 101685984 A | 3/2010 |

(Continued)

OTHER PUBLICATIONS

China National Intellectual Property Administration, International Search Report and Written Opinion, dated Sep. 24, 2020, 9 pages.

*Primary Examiner* — Thomas J. Hiltunen
(74) *Attorney, Agent, or Firm* — Loeb & Loeb LLP

(57) ABSTRACT

A power supply adjusting system, method and apparatus, a chip, and an electronic device. The system includes: a power supply, a power storage circuit and a control circuit the control circuit is connected to the power supply and the load when in use; and the control circuit is configured to obtain a workload change condition of the load and to control, in a case where the workload change condition is that the load increases, the power supply to decrease the supply voltage so that the power storage circuit outputs power to supply power to the load.

16 Claims, 6 Drawing Sheets

(56) References Cited

U.S. PATENT DOCUMENTS

| | | | | |
|---|---|---|---|---|
| 6,965,502 B2* | 11/2005 | Duffy | ................ | G06F 1/305 |
| | | | | 361/111 |
| 6,975,494 B2* | 12/2005 | Tang | ................ | H02M 3/1584 |
| | | | | 361/64 |
| 7,609,040 B1* | 10/2009 | Jain | ................ | H02M 3/1584 |
| | | | | 323/276 |
| 8,055,914 B2* | 11/2011 | Nguyen | ................ | G06F 1/3203 |
| | | | | 713/300 |
| 8,659,282 B2* | 2/2014 | Chen | ................ | H02M 3/157 |
| | | | | 323/285 |
| 10,008,157 B2* | 6/2018 | Kim | ................ | G09G 3/3266 |

FOREIGN PATENT DOCUMENTS

| | | |
|---|---|---|
| CN | 102355042 A | 2/2012 |
| CN | 202978241 U | 6/2013 |

* cited by examiner

POWER SUPPLY ADJUSTING SYSTEM, METHOD AND APPARATUS, CHIP, AND ELECTRONIC DEVICE

CROSS-REFERENCE TO RELATED APPLICATION

This application is an U.S. National Phase application claiming priority to the PCT International Application PCT/CN2019/129922, filed on Dec. 30, 2019. For all purposes, the entire disclosure of the aforementioned application is incorporated by reference as part of the disclosure of this application.

TECHNICAL FIELD

Embodiments of the present disclosure relate to a power supply adjusting system, method and apparatus, a chip, and an electronic device.

BACKGROUND

A power supply is a device that supplies power to the load and the unstable supply voltage at the load side will cause the chip to work abnormally. Therefore, the stability of the supply voltage at the load side is extremely important, and special attention should be paid to the stability of the supply voltage at the load side when designing the chip.

SUMMARY

At least one embodiment of the present disclosure provides a power supply adjusting system, which includes: a power supply, a power storage circuit and a control circuit; wherein the power supply includes a first power output terminal, the first power output terminal is configured to output a supply voltage;
the power storage circuit includes a second power output terminal, the second power output terminal is configured to output power stored in the power storage circuit;
the first power output terminal of the power supply and the second power output terminal of the power storage circuit are electrically connected to a load when in use, and the control circuit is connected to the power supply and the load when in use; and
the control circuit is configured to obtain a workload change condition of the load and to control, in a case where the workload change condition is that the load increases, the power supply to decrease the supply voltage so that the power storage circuit outputs power to supply power to the load.

In at least one embodiment, the control unit is further configured to control, in a case where the workload change condition is that the load decreases, the power supply to increase the supply voltage.

In at least one embodiment, the control circuit is further configured to: obtain a load working frequency of the load; and
determine the workload change condition of the load based on the load working frequency.

In at least one embodiment, the control circuit is further configured to: determine that the workload change condition is that the load increases, in a case where the load working frequency is in a first load working frequency range, wherein the first load working frequency range is a load working frequency range when a load current is greater than a preset standard load current; and output a supply voltage decreasing signal to the power supply to decrease the supply voltage to be below a preset standard supply voltage, in response to determining that the workload change condition is that the load increases.

In at least one embodiment, the control circuit is further configured to: determine that the workload change condition is that the load decreases, in a case where the load working frequency is in a second load working frequency range, wherein the second load working frequency range is a load working frequency range when the load current is smaller than the standard load current; and
output a supply voltage increasing signal to the power supply to increase the supply voltage to be above a preset standard supply voltage, in response to determining that the workload change condition is that the load decreases.

In at least one embodiment, the load includes an adaptive voltage and frequency scaling detection circuit configured to detect the workload change condition; and the control circuit includes: an adaptive voltage and frequency scaling interaction interface which is capable of interacting with the adaptive voltage and frequency scaling detection circuit, wherein the adaptive voltage and frequency scaling interaction interface obtains the workload change condition through the adaptive voltage and frequency scaling detection circuit.

In at least one embodiment, the load includes a load detection circuit which is independent of an adaptive voltage and frequency scaling circuit;
the control circuit includes: a load detection interaction interface which is capable of interacting with the load detection circuit, wherein the load detection interaction interface obtains the workload change condition through the load detection circuit.

In at least one embodiment, the power supply adjusting system further includes a first circuit element and a second circuit element,
wherein a first terminal of the first circuit element is connected with the power output terminal of the power supply, a second terminal of the first circuit element is connected with a first terminal of the second circuit element and the second power output terminal of the power storage circuit, and a second terminal of the second circuit element is connected with the load when in use.

In at least one embodiment, the power storage circuit is a capacitor, and the first circuit element and the second circuit element are inductors.

At least one embodiment of the present disclosure further provides a power supply adjusting method, adapted for the power supply adjusting system according to any of claims 1-9, the power supply adjusting method includes:
obtaining the workload change condition of the load;
outputting a supply voltage decreasing signal to the power supply to decrease the supply voltage and to cause the power storage circuit to output power to the load, in a case where the workload change condition is that the load increases; and
outputting a supply voltage increasing signal to the power supply to increase the supply voltage, in a case where the workload change condition is that the load decreases.

In at least one embodiment, the obtaining the workload change condition of the load includes:
obtaining a load working frequency of the load.

In at least one embodiment, the outputting the supply voltage decreasing signal to the power supply in the case where the workload change condition is that the load increases includes:
determining that the workload change condition is that the load increases, in a case where the load working frequency is in a first load working frequency range, wherein the first load working frequency range is a load working frequency range when a load current is greater than a preset standard load current; and outputting the supply voltage decreasing signal to the power supply to decrease the supply voltage to be below a preset standard supply voltage, in response to determining that the workload change condition is that the load increases.

In at least one embodiment, the outputting the supply voltage increasing signal to the power supply to increase the supply voltage in the case where the workload change condition is that the load decreases includes:

determining that the workload change condition is that the load decreases, in a case where the load working frequency is in a second load working frequency range, wherein the second load working frequency range is a load working frequency range when the load current is smaller than the standard load current; and outputting the supply voltage increasing signal to the power supply to increase the supply voltage to be above the preset standard supply voltage, in response to determining that the workload change condition is that the load decreases.

At least one embodiment of the present disclosure further provides a power supply adjusting apparatus, which includes:

an obtaining circuit, configured to obtain a workload change condition of a load;

a first control circuit, configured to output, in a case where the workload change condition is that the load increases, a supply voltage decreasing signal to a power supply to decrease a supply voltage and cause a power storage circuit to output power to the load; and a second control circuit, configured to output, in a case where the workload change condition is that the load decreases, a supply voltage increasing signal to the power supply to increase the supply voltage.

At least one embodiment of the present disclosure further provides a chip, which includes at least one of:

any one of the above-mentioned power supply adjusting systems; and any one of the above-mentioned power supply adjusting apparatuses.

At least one embodiment of the present disclosure further provides an electronic device, which includes the above-mentioned chip.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

As the advanced manufacturing technology of chips enters the nano age, the chips (especially SoC chips) are becoming more and more powerful. High performance and low power consumption have become two goals of the chip design. However, merely pursuing low power consumption may result in a deviation between the performance and the design, and thus energy efficiency has become one of the main goals of the chip design; energy efficiency refers to an inverse of the power required for each operation of the chip, that is, the number of operations that can be completed per watt of power.

Figure 1:
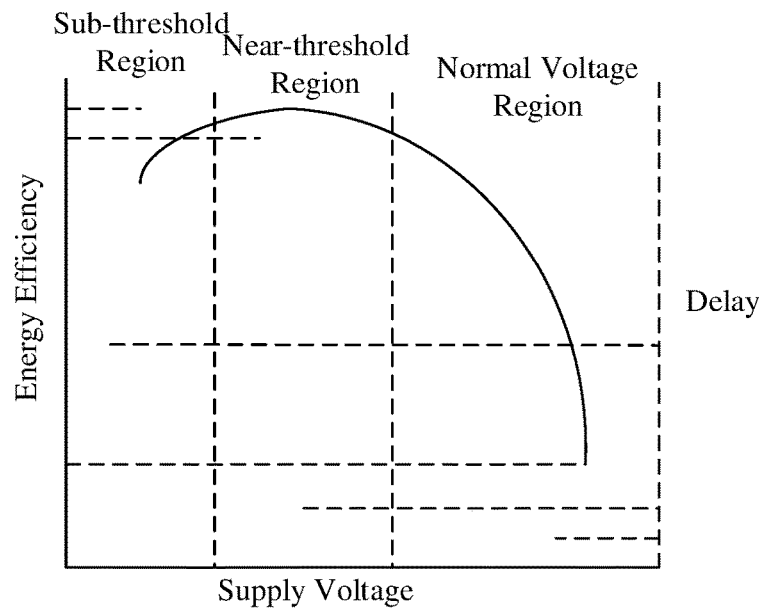
FIG. 1 is a schematic diagram of an influence of a supply voltage of a chip on energy efficiency and delay.

Through researches, it is found that the lowest energy consumption point of the chip of the advanced technology is generally in the sub-threshold region of the voltage, and the highest energy efficiency is generally in the near-threshold region of the voltage. As shown in FIG. 1 which is a schematic diagram of an influence of the supply voltage of the chip on energy efficiency and delay, the delay of the chip circuit continues to increase when the supply voltage drops from a normal voltage region to the near-threshold region, and decreases exponentially in the near-threshold region and the sub-threshold region, while the energy efficiency increases first and then decreases. The energy efficiency is the best in the near-threshold region, and the near-threshold region can be considered as a low-voltage region; in order to balance the energy efficiency and the performance requirements, wide voltage range circuits have been widely used. Wide voltage range circuits can cover the sub-threshold region, the near-threshold region to the normal voltage region, and can be switched over a wide voltage range to meet high performance requirements or energy efficiency requirements for different loads.

However, due to the decrease in the chip process dimension, the problem of PVT (Process, Voltage, and Temperature) deviation has been caused, leading to the requirements of reserving timing margins in order to meet the worst-case timing constraints in chip design. However, the introduction of these timing margins results in that the working voltage or frequency of the chip circuit is too conservative, and even to the extent that offsets the energy efficiency benefits brought by the use of wide voltage range circuits; in order to overcome the voltage deviation in the PVT deviation, especially the voltage deviation during the use of the chip, DVFS (Dynamic Voltage and Frequency scaling) technology and AVFS (Adaptive Voltage and Frequency Scaling) technology may be used at present.

DVFS uses a mechanism called open-loop adjustment, which determines optimal voltages for different target applications and operating frequencies of the chip. However, at the beginning of the design of DVFS, an excessive timing margin is reserved. The design of the excessive timing margin means a waste of a lot of power consumption. As the power consumption of the CPU is positively proportional to the square of the rise of the voltage (closer to the cubic power relationship if electricity leakage is considered), the increase of the voltage value will significantly increase the power consumption. As a result, the power consumption of the chip increases.

The AVFS technology uses a closed-loop system. The voltage is managed through hardware mechanisms on the chip, and then the voltage is adjusted and matched. This can remove unnecessary protective voltage ranges while ensuring the normal function of the chip, thereby eliminating the above-mentioned waste of power.

For example, the AVFS technology can add a PVT monitoring circuit in the chip. When the PVT deviation is large, it is possible to adjust the working frequency or working voltage of the chip to adjust the working voltage to the minimum voltage that maintains the preset working frequency, or adjust the working frequency while maintaining the preset voltage to overcome the voltage deviation problem in the case where the supply voltage is too low; that is, the AVFS technology aims to overcome the voltage deviation problem in the case where the supply voltage is too low, by adaptively adjusting the working voltage and the working frequency of the chip.

Figure 2:
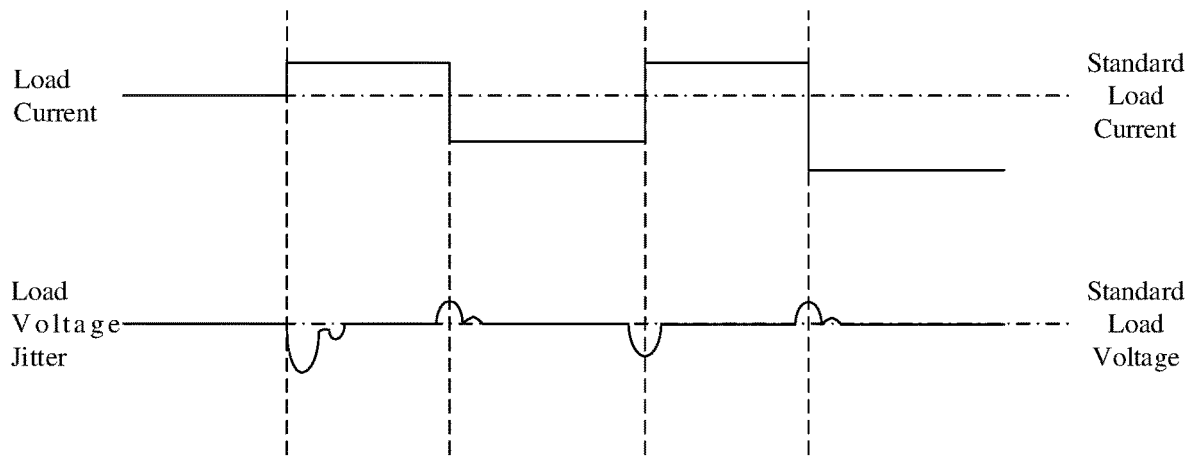
FIG. 2 is a schematic diagram of a jitter of a load voltage.

It can be seen that the use of the AVFS technology provides a better effect than the DVFS technology. However, the inventors of the present disclosure have further found that there are the following problems in the use of the AVFS technology: when the working state of the chip changes, there is a case where the load increases, and in this case, the supply current for the load is required to be increased to meet the power requirements of the load. However, the jitter range of the load voltage that AVFS can handle is still limited. Therefore, it is urgent to provide a new solution to improve the robustness; as an example, FIG. 2 shows a schematic diagram of the jitter of the load voltage, which can be referred to. The increase in the load is indicated by the load current being higher than the standard load current. In this case, there is a jitter of the load voltage drop.

In addition, the change in the working state of the chip will affect the change in the load. At present, when the working state of the chip changes, there is a scenario where the load increases. In this case, the stability of the supply voltage at the load is required to be guaranteed to meet the power supply requirements of the load. Therefore, how to ensure the stability of the supply voltage at the load when the load increases becomes a problem that those skilled in the art are required to solve.

At least one embodiment of the present disclosure provides a novel power supply adjusting scheme, so that the chip can still work normally in a large jitter range of the load voltage, thereby improving the robustness of the chip; optionally, the power supply adjustment system provided by the embodiment of the present disclosure is not limited to being compatible with AVFS, and may also be compatible with other technologies, such as DVFS. Certainly, the power supply adjustment system provided by the embodiments of the present disclosure can also operate independently.

At least one embodiment of the present disclosure provides a power supply adjusting system, which includes: a power supply, a power storage circuit and a control circuit;

The power supply includes a first power output terminal, and the first power output terminal is configured to output a supply voltage;

The power storage circuit includes a second power output terminal, and the second power output terminal is configured to output power stored in the power storage circuit;

The first power output terminal of the power supply and the second power output terminal of the power storage circuit are electrically connected to a load when in use, and the control circuit is connected to the power supply and the load when in use; and The control circuit is configured to obtain a workload change condition of the load and to control, in a case where the workload change condition is that the load increases, the power supply to decrease the supply voltage so that the power storage circuit outputs power to supply power to the load.

Figure 3:
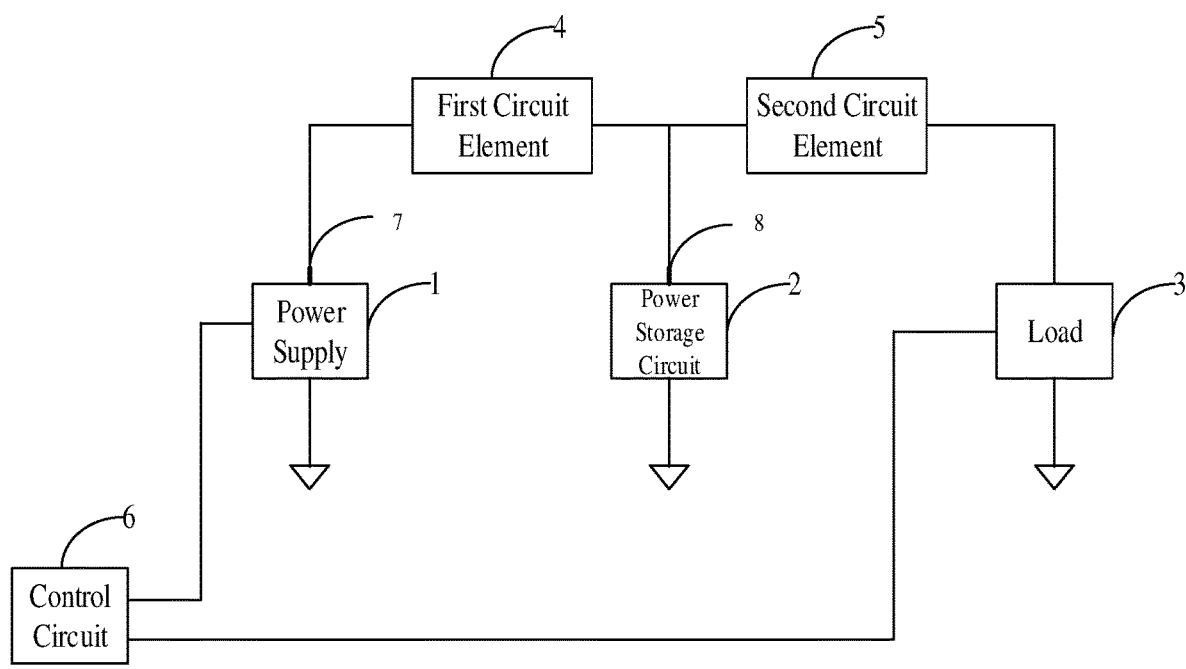
FIG. 3 is a schematic diagram of a power supply adjusting system provided by at least one embodiment of the present disclosure.

As an optional implementation of the disclosed content of at least one embodiment of the present disclosure, FIG. 3 shows a schematic diagram of a power supply adjusting system provided by at least one embodiment of the present disclosure. Optionally, the power supply adjusting system may be compatible with AVFS and provide effective supplement for AVFS; with reference to FIG. 3, the power supply adjusting system may include:

A power supply 1; optionally, the power supply 1 may be managed by a PMU (Power Management Unit) and supply power to the load;

A power storage circuit 2; the power storage circuit 2 may be a circuit component that stores power, for example, an in-cap energy storage circuit, and a capacitor is an example of the power storage circuit;

A load 3; optionally, the load 3 is for example a chip;

A first circuit element 4;

A second circuit element 5;

A control circuit 6; the control circuit 6 may be connected to the power supply 1 and the load 3, and is used to obtain the workload change condition of load 3 and to control to adjust the supply voltage of the power supply 1.

The power supply 1 is an example of the above-mentioned power supply, and the power storage circuit 2 is an example of the above-mentioned power storage circuit, and the control circuit 6 is an example of the above-mentioned control circuit.

Optionally, in at least one embodiment of the present disclosure, the first circuit element 4 may be connected to the power output terminal 7 of the power supply 1, and the second circuit element 5 may be connected to the first circuit element 4, and may be connected to the load 3; specifically, the first terminal of the first circuit element 4 may be connected to the power output terminal 7 of the power supply 1, and the second terminal may be connected to the first terminal of the second circuit element 5, and the second terminal of the second circuit element 5 may be connected to the load 3;

The power output terminal 8 of the power storage circuit 2 may be connected between the first circuit element 4 and the second circuit element; specifically, the power output terminal 8 of the power storage circuit 2 may be connected between the second terminal of the first circuit element 4 and the first terminal of the second circuit element 5.

The power output terminal 7 of the power supply 1 is an example of the above-mentioned first power output terminal, and the power output terminal 8 of the power storage circuit 2 is an example of the above-mentioned second power output terminal.

Optionally, the first circuit element 4 may be a single circuit component or a circuit component group composed of a plurality of circuit components, in an example, the first circuit element 4 may be an inductor; optionally, the second circuit element 5 may be a single circuit component or a circuit component group composed of a plurality of circuit components, in an example, the second circuit element 5 may be an inductor;

In at least one embodiment of the present disclosure, the power supply 1 and the power storage circuit 2 may supply power to the load 3; the control circuit 6 may obtain the workload change condition of the load 3, and control the power supply 1 to adjust the supply voltage according to the workload change condition of the load 3.

In an optional implementation, in order to ensure the stability of the supply voltage and make the jitter range of the load voltage that may be handled by the embodiments of the present disclosure larger, thereby improving the robustness; at least one embodiment of the present disclosure may obtain the workload change condition of the load 3 through the control circuit 6, when the workload change condition is that the load increases, the control circuit 6 may control the power supply 1 to reduce the supply voltage, so that the power storage circuit 2 may output additional power to supply power to the load 3 to achieve voltage compensation for the load 3; optionally, the increasing of the load may include a case where the load current is higher than a predetermined standard load current;

Optionally, further, when the workload change condition indicates that the load decreases, the control circuit 6 may control the power supply 1 to increase the supply voltage; optionally, the decreasing of the load may include a case where the load current is lower than a predetermined standard load current;

Optionally, when the load increases, reducing the supply voltage may be reducing the supply voltage based on a predetermined standard supply voltage, such as reducing the supply voltage to be less than the standard supply voltage; when the load decreases, increasing the supply voltage may be increasing the supply voltage based on the standard supply voltage, such as increasing the supply voltage to be higher than the standard supply voltage.

It can be seen that the embodiment of the present disclosure may reduce the supply voltage of the power supply in the case where the load increases, so that the power storage circuit outputs additional power to supply power to the load in time; when the load decreases, the supply voltage of the power supply may be increased to meet the power requirements of the load and enable the power storage circuit to store power; therefore, the embodiments of the present disclosure may achieve the adaptive control of the supply voltage according to the workload change condition, ensure the stability of the supply voltage at the load side, and extend the jitter range of the load voltage that can be handled at the load side, thereby improving the robustness.

Figure 4:
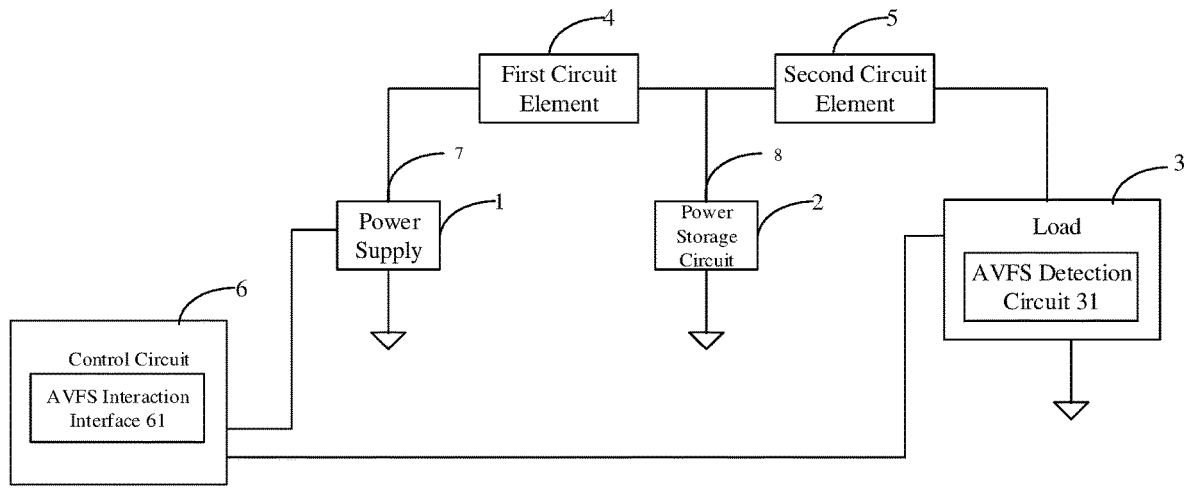
FIG. 4 is another schematic diagram of a power supply adjusting system provided by at least one embodiment of the present disclosure.

As an optional implementation, the load may be, for example, a chip, and the AVFS detection circuit in the load may detect the workload change condition of the load, so that the control circuit may obtain the workload change condition from the AVFS detection circuit; in an example, as shown in FIG. 4:

The load 3 may include an AVFS detection circuit 31, and the AVFS detection circuit 31 may be a circuit portion in the AVFS used for detecting the workload change condition; the control circuit 6 may include an AVFS interaction interface 61, and the AVFS interaction interface may be compatible with AVFS, so as to interact with the AVFS detection circuit 31, to obtain the workload change condition detected by the AVFS detection circuit 31, thereby realizing obtaining the workload change condition by the control circuit; in at least one embodiment of the present disclosure, the control circuit may rely on the AVFS function to obtain the workload change condition, that is, the AVFS detection circuit detects the workload change condition, the control circuit achieve obtaining the workload change condition by arranging an AVFS interaction interface that interacts with the AVFS detection circuit.

Figure 5:
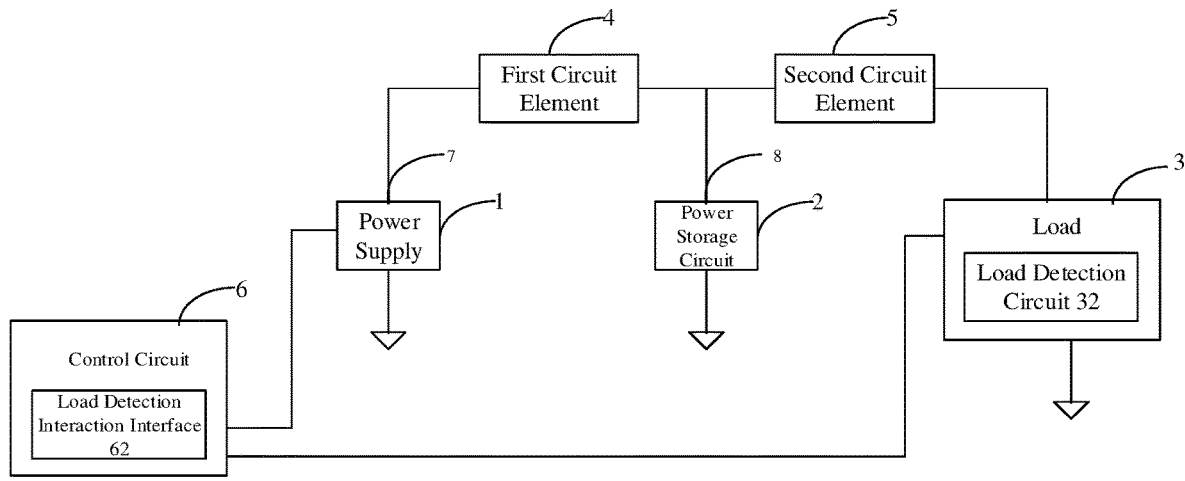
FIG. 5 is another schematic diagram of a power supply adjusting system provided by at least one embodiment of the present disclosure.

In another optional implementation, the load may be, for example, a chip, and the load may be provided with a load detection circuit independent from AVFS, that is, the detection of the workload change condition in at least one embodiment of the present disclosure does not depend on AVFS, instead, an independent load detection circuit is used to detect the workload change condition, so that the control circuit may obtain the workload change condition from the load detection circuit; in an example, as shown in FIG. 5:

The load 3 may include a load detection circuit 32, and the load detection circuit 32 may be a circuit that detects the workload change condition independently of the AVFS; the control circuit 6 may include a load detection interaction interface 62, and the load detection interaction interface may interact with the load detection circuit 32 to obtain the workload change condition detected by the load detection circuit 32, thereby realizing obtaining the workload change condition by the control circuit;

Optionally, as a further implementation, the load current becomes larger, and the load working frequency will probably increase, and therefore, in at least one embodiment of the present disclosure, the workload change condition may be reflected by the load working frequency.

For example, in at least one embodiment of the present disclosure, the load current may be measured for a plurality of load working frequencies, and the first load working frequency range when the load current is higher than the standard load current (the first load working frequency range may not be a continuous frequency range, for example, it may be a combination of a plurality of separate frequency ranges) and the second load working frequency range when the load current is lower than the standard load current (the second load working frequency range may not be a continuous frequency range, for example, it may be a combination of multiple intermittent frequency ranges) are obtained by analyzing, optionally, the first load working frequency range may be higher than the second load working frequency range.

For example, in at least one embodiment, the control circuit is also configured to:

Obtain a load working frequency of the load; and

Determine the workload change condition of the load based on the load working frequency.

Furthermore, the control circuit may determine the workload change condition by obtaining the load working frequency. The load working frequency is detected by, for example, the AVFS detection circuit, and the control circuit interacts with the AVFS detection circuit through the AVFS interaction interface to obtain the load working frequency. For another example, the load working frequency may be detected by the load detection circuit independent of the AVFS, and the control circuit interacts with the load detection circuit through the load detection interaction interface to achieve obtaining the load working frequency; when the load working frequency is within the first load working frequency range, it is determined that the load increases, so that the power supply may be controlled to decrease the supply voltage; when the load working frequency is within the second load working frequency range, it is determined that the load decreases, so that the power supply may be controlled to increase the supply voltage;

For example, in at least one embodiment, the control circuit is also configured to:

Determine that the workload change condition is that the load increases, in a case where the load working frequency is in the first load working frequency range, wherein the first load working frequency range is a load working frequency range when a load current is greater than a preset standard load current; and Output a supply voltage decreasing signal to the power supply to decrease the supply voltage to be below a preset standard supply voltage, in response to determining that the workload change condition is that the load increases.

For example, in at least one embodiment, the control circuit is also configured to:

Determine that the workload change condition is that the load decreases, in a case where the load working frequency is in a second load working frequency range, wherein the second load working frequency range is a load working frequency range when the load current is smaller than the standard load current; and Output a supply voltage increasing signal to the power supply to increase the supply voltage to be above a preset standard supply voltage, in response to determining that the workload change condition is that the load decreases.

Optionally, the adjustment relationship between the workload change condition (such as the load working frequency) and the supply voltage may be determined based on the analyses of the actual situation of the load, which is not limited to the embodiments of the present disclosure; for example, the embodiment of the present disclosure may analyze and determine the numerical relationship between the increase in the load and the reduced supply voltage and the numerical relationship between the decrease in the load and the increased supply voltage according to the actual situation of the load.

It can be seen that, in the embodiment of the present disclosure, the power storage circuit may achieve providing power to the load in a high working frequency range, that is, the high working frequency range of the load power supplying demand may be achieved by the power storage circuit, the high working frequency range may be considered to be that the load working frequency is in the first load working frequency range; when the power storage circuit achieves the high working frequency range of the load power supplying demand and the load power supplying demand is in a low working frequency range, the power supply may increase the supply voltage, and the low working frequency range may be considered to be that the load working frequency is in the second load working frequency range; by repeating these operations, the adaptive control of the supply voltage may be achieved under different workload change conditions. The embodiments of the present disclosure may extend the jitter range of the load voltage that may be handled at the load side while ensuring the stability of the supply voltage at the load side, thereby improved the robustness.

Figure 6:
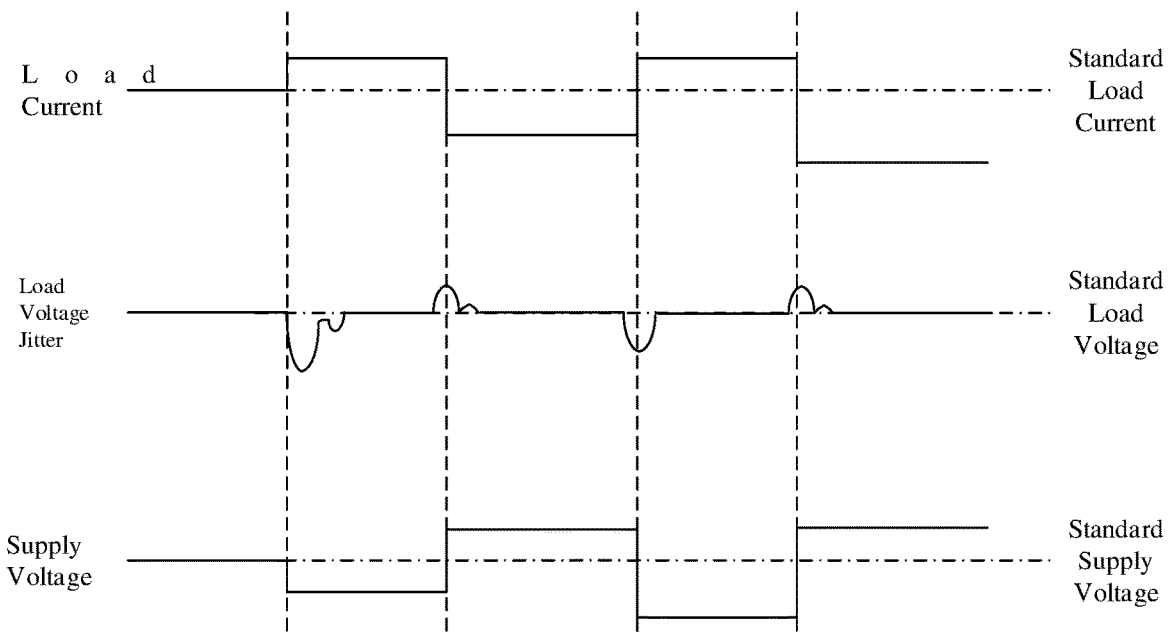
FIG. 6 is a schematic waveform diagram corresponding to at least one embodiment of the present disclosure.

For example, a schematic waveform diagram corresponding to at least one embodiment of the present disclosure is shown in FIG. 6. It can be seen that the supply voltage may be reduced (below the standard supply voltage) when the load increases (indicated by the load current being higher than the standard load current), and the power storage circuit outputs additional power to compensate for the decrease in load voltage; when the load decreases (indicated by the load current lower than the standard load current), the supply voltage increases (higher than the standard supply voltage); by repeating these operations, the adaptive control of the supply voltage at the load side may be achieved under different workload change conditions, and the stability of the supply voltage at the load side is ensured, and the embodiments of the present disclosure is allowed to extend the jitter range of the load voltage that can be handled at the load side (for example, compared with AVFS, the embodiments of the present disclosure may handle lower load voltage jitter), thereby improving the robustness.

Figure 7:
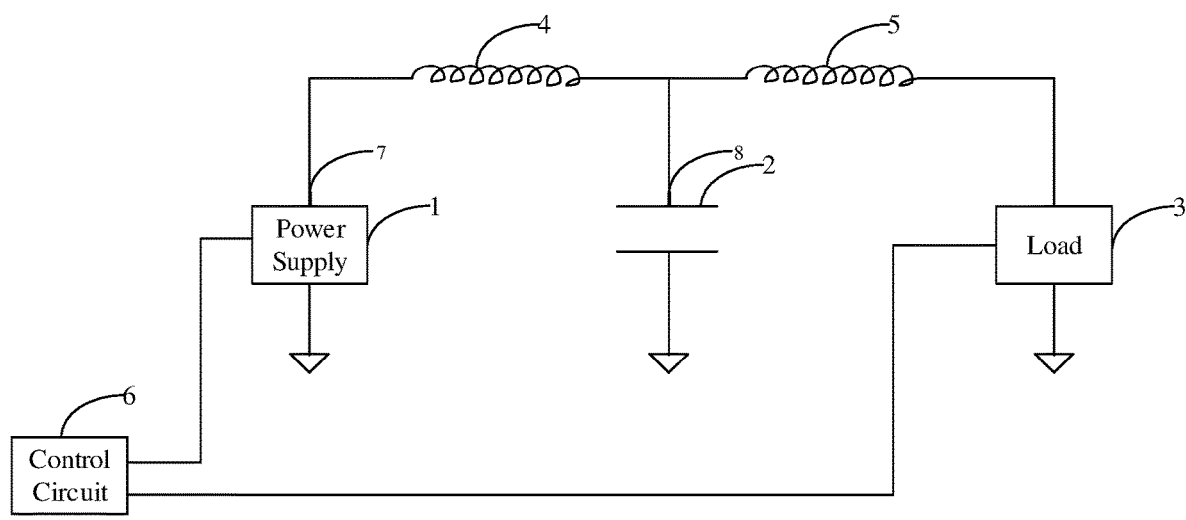
FIG. 7 is another schematic diagram of a power supply adjusting system provided by at least one embodiment of the present disclosure.

In an optional example, another schematic diagram of a power supply adjusting system provided by at least one embodiment of the present disclosure is shown in FIG. 7. In conjunction with FIG. 3 and FIG. 7, in the power supply adjusting system as shown in FIG. 7, the power storage circuit 2 may be a capacitor, and the first circuit element 4 and the second circuit element 5 may be inductors.

The power supply adjusting system provided by the embodiment of the present disclosure may ensure the stability of the supply voltage at the load side under different workload change conditions, and enables the embodiments of the present disclosure to extend the jitter range of the load voltage that can be handled at the load side, thereby improving the robustness.

Optionally, the power supply adjusting method of at least one embodiment of the present disclosure may be performed by the control circuit of the power supply adjusting system provided above, and the power supply adjusting method of at least one embodiment of the present disclosure may be performed by the control circuit in a function mode of the chip; the content of the power adjustment method described below can be cross-referenced with the content described above.

Figure 8:
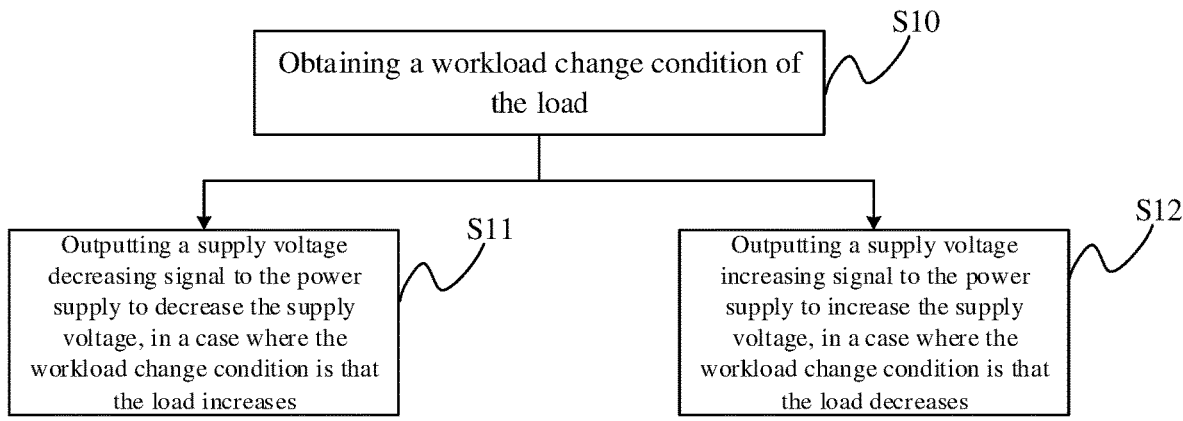
FIG. 8 is a flow chart of a power adjusting method provided by at least one embodiment of the present disclosure.

As an optional implementation, FIG. 8 is a flow chart of a power supply adjusting method provided by at least one embodiment of the present disclosure, and with reference to FIG. 8, the method may include:

Step S10, obtaining a workload change condition of the load.

In at least one embodiment, step S10 may include: obtaining a load working frequency of the load;

In an optional implementation, the AVFS detection circuit detects a workload change condition, and the control circuit interacts with the AVFS detection circuit to obtain the workload change condition; in another optional implementation, the load detection circuit independent of the AVFS detects the workload change condition, and the control circuit interacts with the load detection circuit to obtain the workload change condition;

Optionally, the workload change condition may include that the load increases and the load decreases, and whether the load increases or decreases may be adjusted by the change of the chip woking state.

Optionally, in at least one embodiment of the present disclosure, the workload change condition may be reflected by the load working frequency.

Step S11, outputting a supply voltage decreasing signal to the power supply to decrease the supply voltage, in a case where the workload change condition is that the load increases.

Optionally, the increasing of the load may include the case where the load working frequency is in a first load working frequency range, wherein the first load working frequency range is a load working frequency range when the load current is larger than a predetermined standard load current. When the load increases, the embodiment of the present disclosure may maintain the output of the supply voltage decreasing signal to the power supply, so that the power supply reduces the supply voltage (e.g., lower than the standard supply voltage), and in this case, the power storage circuit shown in FIG. 3 may output additional power to supply power to the load.

In at least one embodiment, step S11 may include:

Determining that the workload change condition is that the load increases, in a case where the load working frequency is in the first load working frequency range, wherein the first load working frequency range is a load working frequency range when a load current is greater than a preset standard load current; and Outputting a supply voltage decreasing signal to the power supply to decrease the supply voltage to be below a preset standard supply voltage, in response to determining that the workload change condition is that the load increases.

Step S12, outputting a supply voltage increasing signal to the power supply to increase the supply voltage, in a case where the workload change condition is that the load decreases. Optionally, the decreasing of the load may include the case where the load working frequency is in the second load working frequency range, wherein the second load working frequency range is a load working frequency range when the load current is less than a predetermined standard load current. When the load decreases, the embodiment of the present disclosure may maintain outputting the supply voltage increasing signal to the power supply, so that the power supply increases the supply voltage (e.g., higher than a standard supply voltage).

In at least one embodiment, step S12 may include:

Determining that the workload change condition is that the load decreases, in a case where the load working frequency is in a second load working frequency range, wherein the second load working frequency range is a load working frequency range when the load current is smaller than the standard load current; and Outputting a supply voltage increasing signal to the power supply to increase the supply voltage to be above a preset standard supply voltage, in response to determining that the workload change condition is that the load decreases.

Figure 9:
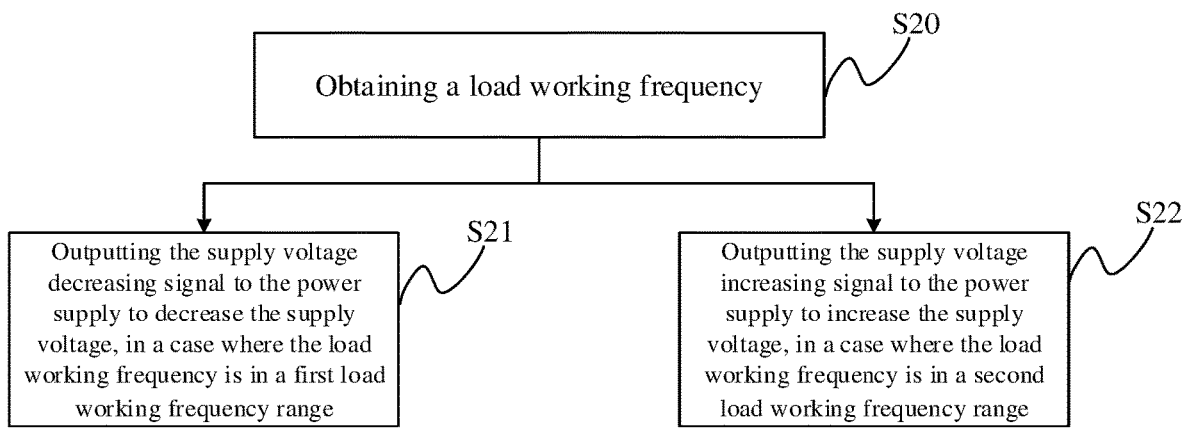
FIG. 9 is another flow chart of a power adjusting method provided by at least one embodiment of the present disclosure.

As an optional implementation of the method in FIG. 8, another flow chart of a power supply adjusting method provided by at least one embodiment of the present disclosure is shown in FIG. 9 and with reference to FIG. 9, the method may include:

Step S20, obtaining a load working frequency. Step S20 may be included in above-mentioned step S10.

Step S21, outputting a supply voltage decreasing signal to a power supply to decrease a supply voltage, in a case where the load working frequency is in a first load working frequency range. Step S21 may be included in above-mentioned step S11.

Step S12, outputting a supply voltage increasing signal to the power supply to increase the supply voltage, in a case where the load working frequency is in a second load working frequency range. Step S22 may be included in above-mentioned step S12.

The power supply adjusting method provided by at least one embodiment of the present disclosure may reduce the supply voltage in the high working frequency range of the load power supplying demand, and the power storage circuit outputs additional power to supply power to the load; however, in the low working frequency range of the load power supplying demand, the supply voltage may be increased, and power storing of the power storage circuit may be realized while power is supplied to the load; through the power supply adjusting method provided by the embodiments of the present disclosure, the adaptive control of the supply voltage may be achieved in the high working frequency range and low working frequency range of the load power supplying demand, the stability of the supply voltage at the load side is ensured, and the embodiments of the present disclosure may extend the jitter range of the load voltage that may be handled at the load side, thereby improved the robustness.

A number of example solutions provided by the embodiments of the present disclosure are described above, and various optional methods introduced by these example solutions may be combined with each other and cross-referenced on a non-conflicting basis, and thus, a variety of possible example schemes are extended, and these can be considered as the disclosed example schemes of the embodiments of the present disclosure.

At least one embodiment of the present disclosure provides a power supply adjusting apparatus, which may be considered as a functional module that the control circuit described above requires to implement the power supply adjusting method provided by at least one embodiment of the present disclosure. The content of the power supply adjusting apparatus described below may be based on the power supply adjusting system described above, and may be cross-referenced with the content described above.

Figure 10:
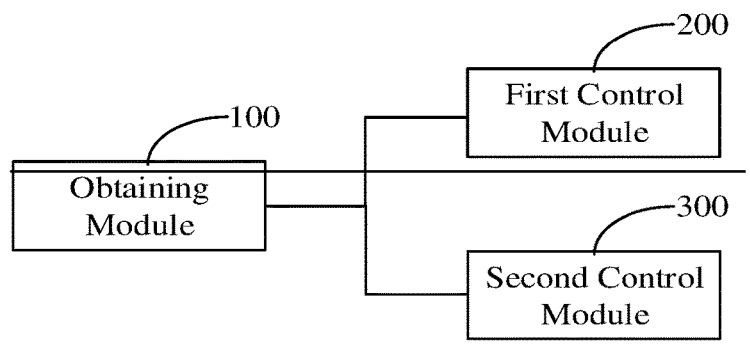
FIG. 10 is a block diagram of a power supply adjusting apparatus provided by at least one embodiment of the present disclosure.

FIG. 10 is a diagram of a power supply adjusting apparatus provided by at least one embodiment of the present disclosure, and with reference to FIG. 10, the power supply adjusting apparatus may include:

An obtaining module 100, configured to obtain a workload change condition at a load side;

A first control module 200, configured to output, in a case where the workload change condition is that the load increases, a supply voltage decreasing signal to the power supply to decrease a supply voltage and cause a power storage circuit to output additional power to the load; and A second control module 300, configured to output, in a case where the workload change condition is that the load decreases, a supply voltage increasing signal to the power supply to increase the supply voltage.

Optionally, in obtaining the workload change condition of the load, the obtaining module 100 is further configured to:

Obtain a load working frequency of the load.

For example, the first control module 200 is also configured to:

Determine that the workload change condition is that the load increases, in a case where the load working frequency is in a first load working frequency range, wherein the first load working frequency range is a load working frequency range when a load current is greater than a preset standard load current; and Output the supply voltage decreasing signal to the power supply to decrease the supply voltage to be below a preset standard supply voltage, in response to determining that the workload change condition is that the load increases.

For example, the second control module 300 is also configured to:

Determine that the workload change condition is that the load decreases, in a case where the load working frequency is in a second load working frequency range, wherein the second load working frequency range is a load working frequency range when a load current is smaller than the standard load current; and Output the supply voltage increasing signal to the power supply to increase the supply voltage to be above the standard supply voltage, in response to determining that the workload change condition is that the load decreases.

Figure 11:
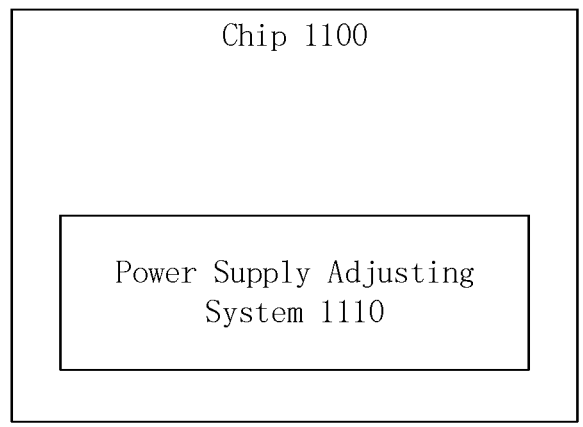
FIG. 11 is a schematic block diagram of a chip provided by at least one embodiment of the present disclosure.

At least one embodiment of the present disclosure further provides a chip, which may be, for example, an SoC (system on chip) chip and may include any one of the above-mentioned power supply adjusting systems. As shown in FIG. 11, the chip 1100 according to at least one embodiment of the present disclosure may include a power supply adjusting system 1110, which may be any one of the above-mentioned power supply adjusting systems. For example, the power supply adjusting system 1110 may be any one of the power supply adjusting systems as shown in FIG. 3, FIG. 4, FIG. 5 and FIG. 7.

Figure 12:
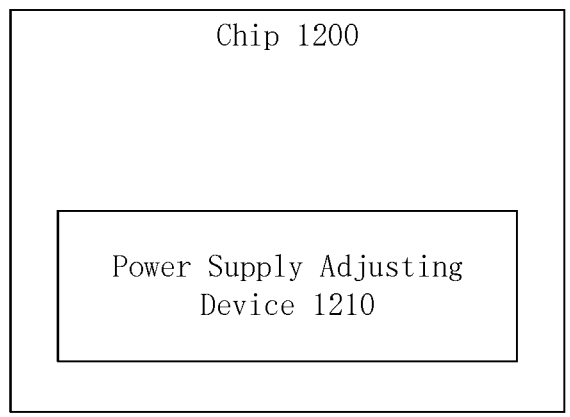
FIG. 12 is a schematic block diagram of a chip provided by at least one embodiment of the present disclosure.

At least one embodiment of the present disclosure further provides a chip, which may be, for example, an SoC (system on chip) chip and may include any one of the above-mentioned power supply adjusting apparatuses. As shown in FIG. 12, the chip 1200 according to at least one embodiment of the present disclosure may include a power supply adjusting apparatus 1210, which may be any one of the above-mentioned power supply adjusting apparatuses. For example, the power supply adjusting apparatus 1210 may be the power supply adjusting apparatus as shown in FIG. 10.

In addition, it should be understood that the chip provided by at least one embodiment of the present disclosure may include a combination of the power supply adjusting system and the power supply adjusting apparatus described above, which is not limited in the embodiments of the present disclosure. For example, the above-mentioned power supply adjusting apparatus may be used as the control circuit in the above-mentioned power supply adjusting system.

The above-mentioned chip may adopt, for example, any suitable architecture, such as X86, ARM, RiSC-V, and MIPS, and the embodiments of the present disclosure are not limited thereto.

Figure 13:
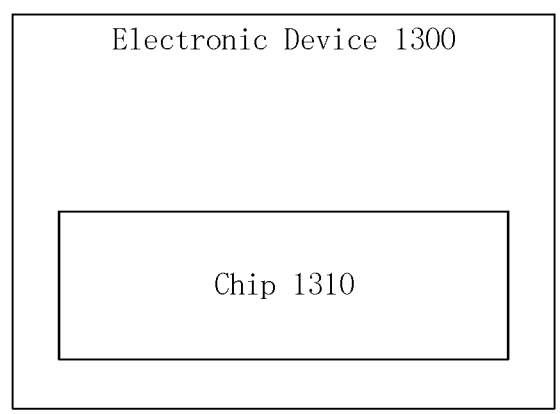
FIG. 13 is a schematic block diagram of an electronic device provided by at least one embodiment of the present disclosure.

At least one embodiment of the present disclosure further provides an electronic device, which may include the above-mentioned chip. As shown in FIG. 13, an electronic device 1300 according to at least one embodiment of the present disclosure may include a chip 1310, which may be any one of the above-mentioned chips. For example, the chip 1310 may be the chip 1110 as shown in FIG. 11, the chip 1200 as shown in FIG. 12 or combinations thereof.

The electronic device 1300 may be a terminal device or a server device. For example, the electronic device may be a workstation, a cluster, a rack server, a blade server, a personal computer, a notebook computer, a tablet computer, a mobile phone, a personal digital assistance (personal digital assistance, PDA), smart glasses, a smart watch, a smart ring, a smart helmet and the like, and the embodiments of the present disclosure have no limitation in this aspect.

What are described above is related to the illustrative embodiments of the disclosure only and not limitative to the scope of the disclosure; the scopes of the disclosure are defined by the accompanying claims.

What is claimed is:

1. A power supply adjusting system, comprising: a power supply, a power storage circuit and a control circuit,
   wherein the power supply comprises a first power output terminal, the first power output terminal is configured to output a supply voltage;
   the power storage circuit comprises a second power output terminal, the second power output terminal is configured to output power stored in the power storage circuit;
   the first power output terminal of the power supply and the second power output terminal of the power storage circuit are electrically connected to a load when in use, and the control circuit is connected to the power supply and the load when in use; and
   the control circuit is configured to obtain a workload change condition of the load and to control, in a case where the workload change condition is that the load increases, the power supply to decrease the supply voltage so that the power storage circuit outputs power to supply power to the load,
   wherein the control circuit is further configured to:
   obtain a load working frequency of the load; and
   determine the workload change condition of the load based on the load working frequency.

2. The power supply adjusting system according to claim 1, wherein the control circuit is further configured to:
   determine that the workload change condition is that the load increases, in a case where the load working frequency is in a first load working frequency range, wherein the first load working frequency range is a load working frequency range when a load current is greater than a preset standard load current; and
   output a supply voltage decreasing signal to the power supply to decrease the supply voltage to be below a preset standard supply voltage, in response to determining that the workload change condition is that the load increases.

3. The power supply adjusting system according to claim 2, wherein the control circuit is further configured to:
   determine that the workload change condition is that the load decreases, in a case where the load working frequency is in a second load working frequency range, wherein the second load working frequency range is a load working frequency range when the load current is smaller than the standard load current; and
   output a supply voltage increasing signal to the power supply to increase the supply voltage to be above a preset standard supply voltage, in response to determining that the workload change condition is that the load decreases.

4. The power supply adjusting system according to claim 1, wherein
   the load comprises an adaptive voltage and frequency scaling detection circuit configured to detect the workload change condition; and the control circuit comprises: an adaptive voltage and frequency scaling interaction interface which is capable of interacting with the adaptive voltage and frequency scaling detection circuit, wherein the adaptive voltage and frequency scaling interaction interface obtains the workload change condition through the adaptive voltage and frequency scaling detection circuit.

5. The power supply adjusting system according to claim 1, wherein
the load comprises a load detection circuit which is independent of an adaptive voltage and frequency scaling circuit;
the control circuit comprises: a load detection interaction interface which is capable of interacting with the load detection circuit, wherein the load detection interaction interface obtains the workload change condition through the load detection circuit.

6. The power supply adjusting system according to claim 1, further comprising a first circuit element and a second circuit element,
wherein a first terminal of the first circuit element is connected with the power output terminal of the power supply, a second terminal of the first circuit element is connected with a first terminal of the second circuit element and the second power output terminal of the power storage circuit, and a second terminal of the second circuit element is connected with the load when in use.

7. The power supply adjusting system according to 6, wherein the power storage circuit is a capacitor, and the first circuit element and the second circuit element are inductors.

8. The power supply adjusting system according to claim 1, wherein the control unit is further configured to control, in a case where the workload change condition is that the load decreases, the power supply to increase the supply voltage.

9. A power supply adjusting method, adapted for a power supply adjusting system, the power supply adjusting system comprising: a power supply, a power storage circuit and a control circuit,
wherein the power supply comprises a first power output terminal, the first power output terminal is configured to output a supply voltage;
the power storage circuit comprises a second power output terminal, the second power output terminal is configured to output power stored in the power storage circuit;
the first power output terminal of the power supply and the second power output terminal of the power storage circuit are electrically connected to a load when in use, and the control circuit is connected to the power supply and the load when in use; and
the control circuit is configured to obtain a workload change condition of the load and to control, in a case where the workload change condition is that the load increases, the power supply to decrease the supply voltage so that the power storage circuit outputs power to supply power to the load,
the power supply adjusting method comprising:
obtaining the workload change condition of the load;
outputting a supply voltage decreasing signal to the power supply to decrease the supply voltage and to cause the power storage circuit to output power to the load, in a case where the workload change condition is that the load increases; and
outputting a supply voltage increasing signal to the power supply to increase the supply voltage, in a case where the workload change condition is that the load decreases,
wherein the obtaining the workload change condition of the load comprises:
obtaining a load working frequency of the load.

10. The power supply adjusting method according to claim 9, wherein
the outputting the supply voltage decreasing signal to the power supply in the case where the workload change condition is that the load increases comprises:
determining that the workload change condition is that the load increases, in a case where the load working frequency is in a first load working frequency range, wherein the first load working frequency range is a load working frequency range when a load current is greater than a preset standard load current; and
outputting the supply voltage decreasing signal to the power supply to decrease the supply voltage to be below a preset standard supply voltage, in response to determining that the workload change condition is that the load increases.

11. The power supply adjusting method according to claim 9, wherein
the outputting the supply voltage increasing signal to the power supply to increase the supply voltage in the case where the workload change condition is that the load decreases comprises:
determining that the workload change condition is that the load decreases, in a case where the load working frequency is in a second load working frequency range, wherein the second load working frequency range is a load working frequency range when a load current is smaller than a standard load current; and
outputting the supply voltage increasing signal to the power supply to increase the supply voltage to be above a preset standard supply voltage, in response to determining that the workload change condition is that the load decreases.

12. A power supply adjusting apparatus, comprising:
an obtaining circuit, configured to obtain a workload change condition of a load;
a first control circuit, configured to output, in a case where the workload change condition is that the load increases, a supply voltage decreasing signal to a power supply to decrease a supply voltage and cause a power storage circuit to output power to the load; and
a second control circuit, configured to output, in a case where the workload change condition is that the load decreases, a supply voltage increasing signal to the power supply to increase the supply voltage,
wherein in obtaining the workload change condition of the load, the obtaining circuit is further configured to:
obtain a load working frequency of the load.

13. The power supply adjusting apparatus according to claim 12, wherein the first control circuit is further configured to:
determine that the workload change condition is that the load increases, in a case where the load working frequency is in a first load working frequency range, wherein the first load working frequency range is a load working frequency range when a load current is greater than a preset standard load current; and
output the supply voltage decreasing signal to the power supply to decrease the supply voltage to be below a preset standard supply voltage, in response to determining that the workload change condition is that the load increases.

14. The power supply adjusting apparatus according to claim 12, wherein the second control circuit is further configured to:

determine that the workload change condition is that the load decreases, in a case where the load working frequency is in a second load working frequency range, wherein the second load working frequency range is a load working frequency range when a load current is smaller than a standard load current; and output the supply voltage increasing signal to the power supply to increase the supply voltage to be above a preset standard supply voltage, in response to determining that the workload change condition is that the load decreases.

15. A chip, comprising at least one of:

a power supply adjusting system; and the power supply adjusting apparatus to claim 12;

wherein the power supply adjusting system comprises: a power supply, a power storage circuit and a control circuit;

the power supply comprises a first power output terminal, the first power output terminal is configured to output a supply voltage;

the power storage circuit comprises a second power output terminal, the second power output terminal is configured to output power stored in the power storage circuit;

the first power output terminal of the power supply and the second power output terminal of the power storage circuit are electrically connected to a load when in use, and the control circuit is connected to the power supply and the load when in use; and the control circuit is configured to obtain a workload change condition of the load and to control, in a case where the workload change condition is that the load increases, the power supply to decrease the supply voltage so that the power storage circuit outputs power to supply power to the load, wherein the control circuit is further configured to:

obtain a load working frequency of the load; and determine the workload change condition of the load based on the load working frequency.

16. An electronic device, comprising the chip according to claim 15.

* * * * *